United States Patent Office 3,427,612
Patented Feb. 11, 1969

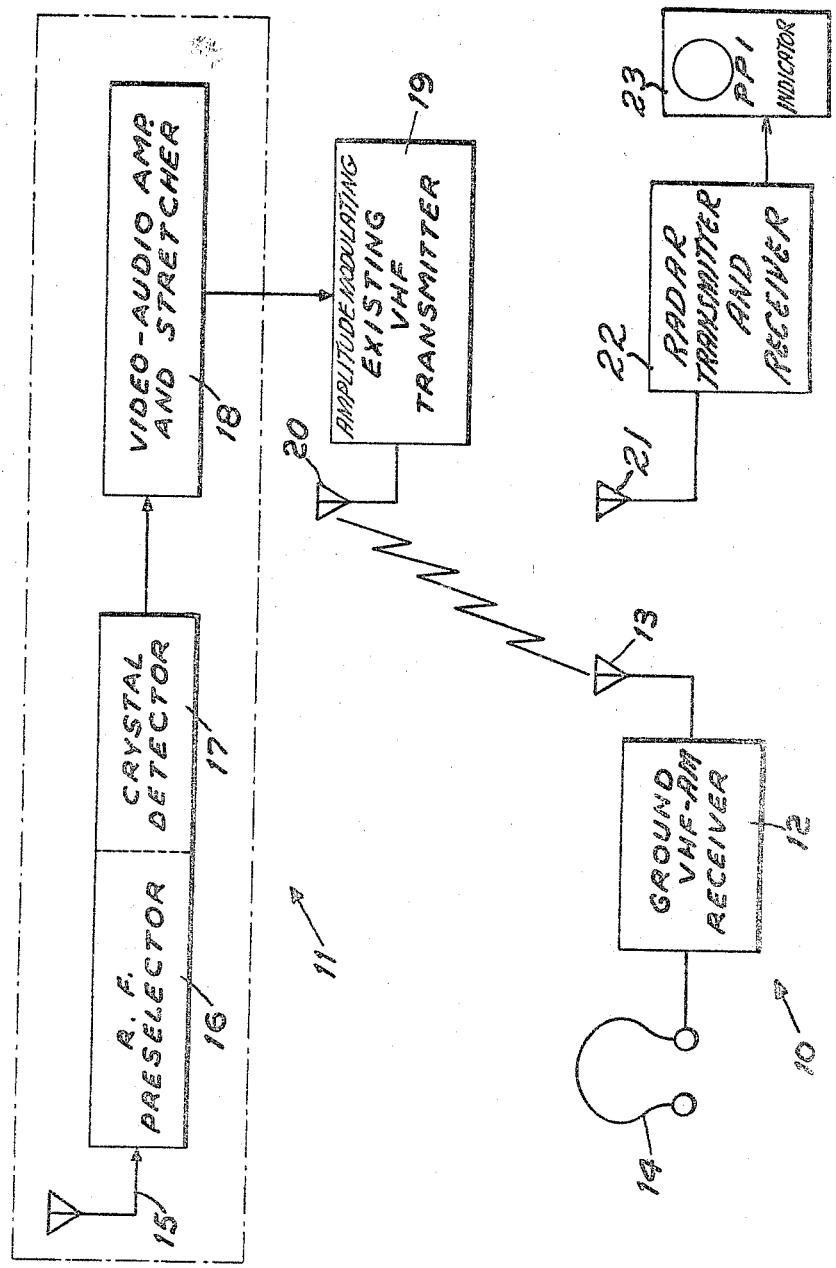

3,427,612
AIR TO GROUND RADAR TARGET IDENTIFICATION SYSTEM
John Vander Horn, Wyckoff, N.J., assignor to International Telephone and Telegraph Corporation, Nutley, N.J., a corporation of Maryland
Filed Apr. 28, 1966, Ser. No. 545,970
U.S. Cl. 343—6.5
Int. Cl. G01s 9/56
3 Claims

ABSTRACT OF THE DISCLOSURE

A radar target identification system wherein a transponder located within a target vehicle generates a tone in response to a radar burst from a radar control station. The tone is "patched" into the VHF voice channel in the target vehicle and transmitted to the radar control station wherein it is heard on the radar controller's headphones as a "beep" coincident with the indication of the target on the radar indicator at the control station.

---

This invention relates to radio systems for object identification and more particularly to a system wherein a radar operator can identify on a radar screen the particular target with which he is in communication.

In congested control areas a radar operator often encounters great difficulty in distinguishing a single target with which he is in communication from the many targets in the immediaate area. Without going to great expense in providing each aircraft with complex identification equipment, such as IFF, the radar operator is left to requiring the aircraft (target) to execute a specific flight pattern for identification purposes.

Accordingly, it is an object of this invention to provide a relatively simple, economical system for providing a radar operator with information as to the particular displayed aircraft with which he is in communication.

The above-mentioned and other features and objects of tthis invention will become more apparent by reference to the following description taken in conjunction with the accompanying drawing which is a block diagram illustrating an embodiment of the invention.

Briefly, the embodiment illustrated provides a transponder within an aircraft for detecting a ground control's radar burst as it passes the aircraft, and for generating an audio tone in response thereto; which tone is "patched" into the aircrafts existing VHF voice channel, is transmitted to the ground control, and is heard in the controller's head-phones as a beep when his radar beam passes the target of interest.

In the drawing there is illustrated a portion of a ground radar station 10 which is in communication with an aircraft, a portion of the electronics of which is illustrated at 11. The ground station 10 includes a standard radar set including an antenna 21, a radar transmitter-receiver 22 and an indicating device such as a PPI indicator 22 for displaying targets (aircraft in the range of the radar set) and a VHF AM receiver 12 with its associated antenna 13 and head-phones 14 for communicating with aircrafts. The illustrated aircraft electronics includes an antenna 15 coupled to an R.F. preselector 16 and a detector 17, the output from the detector 17 being coupled to a video-audio amplifier and stretcher 18, the output from which is fed to the aircraft's existing amplitude modulating VHF transmitter 19 and antenna 20.

Operation of the system shown in FIGURE 1 is as follows:

The small receiver represented by R.F. preselector 16, crystal detector 17 and video-audio amplifier and stretcher 18 is fed by antenna 15 which receives the ground controller's radar burst as it passes the aircraft. The signal at the output of preselector 16 would be, for example, pulses of R.F. energy which upon detection at 17 would appear as video pulses. The video pulses are amplified and stretched by device 18 and the signal thus produced is "patched" into the aircraft's existing VHF transmitter 19 for transmission to the ground operator via antenna 20. The signal is received at the ground station by receiver 12 via antenna 13, and is heard in the controller's headphones 14 as a beep when his radar beam passes the target of interest, that is, the aircraft with which he is in communication.

The system provides radar target identification for use of air traffic controllers handling high traffic flow with a very minimum equipment in the aircraft and no additional ground equipment than that already contained in present day air traffic control stations.

Various enhancements to the system can be made, such as the coding in binary or decimal form of the aircrafts altimeter. This information is of sufficiently low bandwidth that it could be handled within the five kc bandwidth allowed by the VHF transmitter during the average burst length interval of approximately 30 to 50 milliseconds. Thus, not only target location but altitude would be immediately available to the ground controller.

While I have described above the principles of my invention in connection with specific apparatus, it is to be clearly understood that the specification is presented by way of example and not as a limitation of the scope of my invention, as set forth in the accompanying claims.

I claim:
1. A radar target identification system for identifying at a radar control station the particular radar indication corresponding to the target with which said control station is in communication, comprising:
   radar means, including indicating means, at the control station for transmitting radar bursts of R.F. energy and for continually identifying the positions of targets on said indicating means;
   means at said target for detecting a radar burst as it passes said target;
   means at said target coupled to said detecting means for transmitting a response to said detected radar burst, said response containing an audio frequency component;
   means at said control station for receiving the response from said target; and
   means coupled to said control station receiving means responsive to the audio frequency component of said received response for providing a signal independent of and substantially in coincidence with the radar indication of said target;
   said detecting means including,
      an antenna for receiving the pulses of R.F. energy with said radar burst;
      an R.F. preselector coupled to said antenna;
      a detector coupled to said preselector;
      an amplifier-stretcher coupled to said detector; and
      means coupling the output from said amplifier-stretcher to said transmitting means.

2. Apparatus according to claim 1 wherein said target is in voice communication with said control station and wherein:

the output from said amplifier-stretcher is transmitted as an audio tone modulated on a carrier wave;

said indicating means at said control station includes a visual indicator; and said responsive means at said control station includes means for providing an audio signal responsive to said audio tone such that by audio-visual correlation the control station is apprised of the particular target on the visual display with which it is in communication.

3. Apparatus according to claim 2 wherein said responsive means at said control station includes headphones coupled to said receiving means for providing said audio signal.

References Cited

UNITED STATES PATENTS

| | | | |
|---|---|---|---|
| 2,592,777 | 4/1952 | Williams | 343—6.5 |
| 3,078,460 | 2/1963 | Werner et al. | 343—6.5 X |
| 3,122,737 | 2/1964 | Setrin | 343—6.5 |
| 3,296,615 | 1/1967 | Page et al. | 343—6.5 |
| 3,302,196 | 1/1967 | McCoy | 343—6.5 |

RODNEY D. BENNETT, *Primary Examiner.*

M. F. HUBLER, *Assistant Examiner.*

U.S. Cl. X.R.

343—6, 6.8